United States Patent [19]
Le Creff

[11] Patent Number: 4,668,542
[45] Date of Patent: May 26, 1987

[54] REFLECTOR PRODUCED BY CONSECUTIVE INJECTIONS OF TWO THERMOPLASTIC MATERIALS

[75] Inventor: Rene Le Creff, Sens, France

[73] Assignee: Neiman, Courbevoie, France

[21] Appl. No.: 702,556

[22] Filed: Feb. 15, 1985

[30] Foreign Application Priority Data

Nov. 13, 1984 [FR] France ................................ 84 17250

[51] Int. Cl.4 .............................................. B60R 13/00
[52] U.S. Cl. ...................................... 428/31; 428/215; 428/474.7; 350/641
[58] Field of Search ...................... 428/474.7, 31, 215; 350/641

[56] References Cited

U.S. PATENT DOCUMENTS 3,723,241 3/1973 Rakus .............................. 428/474.7

FOREIGN PATENT DOCUMENTS 155239 8/1985 Japan ................................ 428/474.4

*Primary Examiner*—Edith Buffalow
*Attorney, Agent, or Firm*—Dowell & Dowell

[57] ABSTRACT

An automobile headlamp reflector is produced by successive injections of a plastics material comprising a first, internal layer of polyamide forming a skin, a second layer of a charged polyamide with 50±5% mineral and/or organic filler forming a supporting structure, and a third, external layer of polyamide, said first and third layer forming skin surrounding said supporting structure.

The ratio EPI/ES in the optical zone of the reflector is such that the surface does not display a local variation greater than 0.002/mm; EPI and ES being respectively the thicknesses of the first, internal layer and the supporting structure.

3 Claims, 2 Drawing Figures

REFLECTOR PRODUCED BY CONSECUTIVE INJECTIONS OF TWO THERMOPLASTIC MATERIALS

BACKGROUND TO THE INVENTION

The present invention relates to a reflector produced by consecutive injections of thermoplastic materials, especially for headlamps of automobile vehicles.

For several years it has been proposed to replace metallic reflectors attached in a support by reflectors of thermoplastic material. This solution offers numerous advantages compared with attached metallic reflectors. Reflectors of thermoplastic material can be moulded in one single piece with the support, with comparatively reduced industrial means. They are lighter, can assume different and varied forms, and in general they offer better resistance to atmospheric and chemical agents.

However in general they possess drawbacks connected with the function of the reflector. In fact the reflecting surface must be as fine as possible, while the reflector with the support of which generally it is a part, must have good mechanical strength and especially excellent thermal resistance. In fact the temperature generated by the lamps placed in the vicinity of the reflecting surface must produce only slight deformation of the latter, compatible with the performance required of the reflector. Of course the thermoplastic material must be cheap and easy to mould.

These contradictory qualities have led to the use of reinforced thermoplastic materials the surface condition of which does not permit metallisation in order to obtain a usable reflecting surface. Thus it was necessary to lacquer these materials before metallisation, which increases the cost price and the rejects.

OBJECT OF THE INVENTION

An object of the invention is to produce a reflector comprising layers of at least two thermoplastic materials, one constituting a supporting structure possessing the required qualities, especially the mechanical and thermal resistance, and another of high quality forming a skin suitable for direct metalization thus avoiding the necessity of intermediate lacquering.

SUMMARY OF THE INVENTION

According to the invention there is provided a reflector produced by successive injections of thermoplastics material comprising a first, internal layer of high quality polyamide, a second layer of polyamide with a filler in the amount of 45 to 55% forming a supporting structure resistant to mechanical and thermal deformation, and a third external layer of polyamide, said first and third layers serving to surround said second layer, the ratio of the thickness of the first layer to the thickness of the second layer in the optical zone of the reflector being so selected that the surface displays no local variation greater than 0.002/mm.

The ratio of thickness between the internal skin material and supporting structure is selected to give optimum results, as regards both the mechanical and optical qualities and the facility of production of the reflector, for thermoplastics materials suitable for the manufacture of reflectors.

It has in fact been perceived, after lengthy experimentation, that the quality of the reflector is directly bound to the constancy of the ratio between the useful internal skin thickness, that is that receiving the metalization, and the thickness of the structure carrying this internal skin.

DESCRIPTION OF PREFERRED EMBODIMENTS

Figure 2:
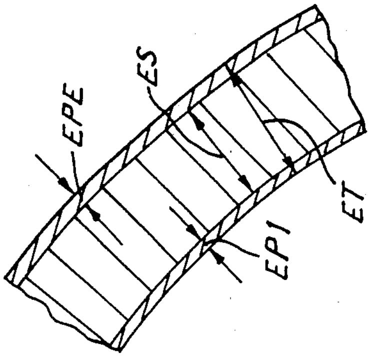
FIG. 2 is an enlarged section of an encircled portion marked X in FIG. 1.
Figure 1:
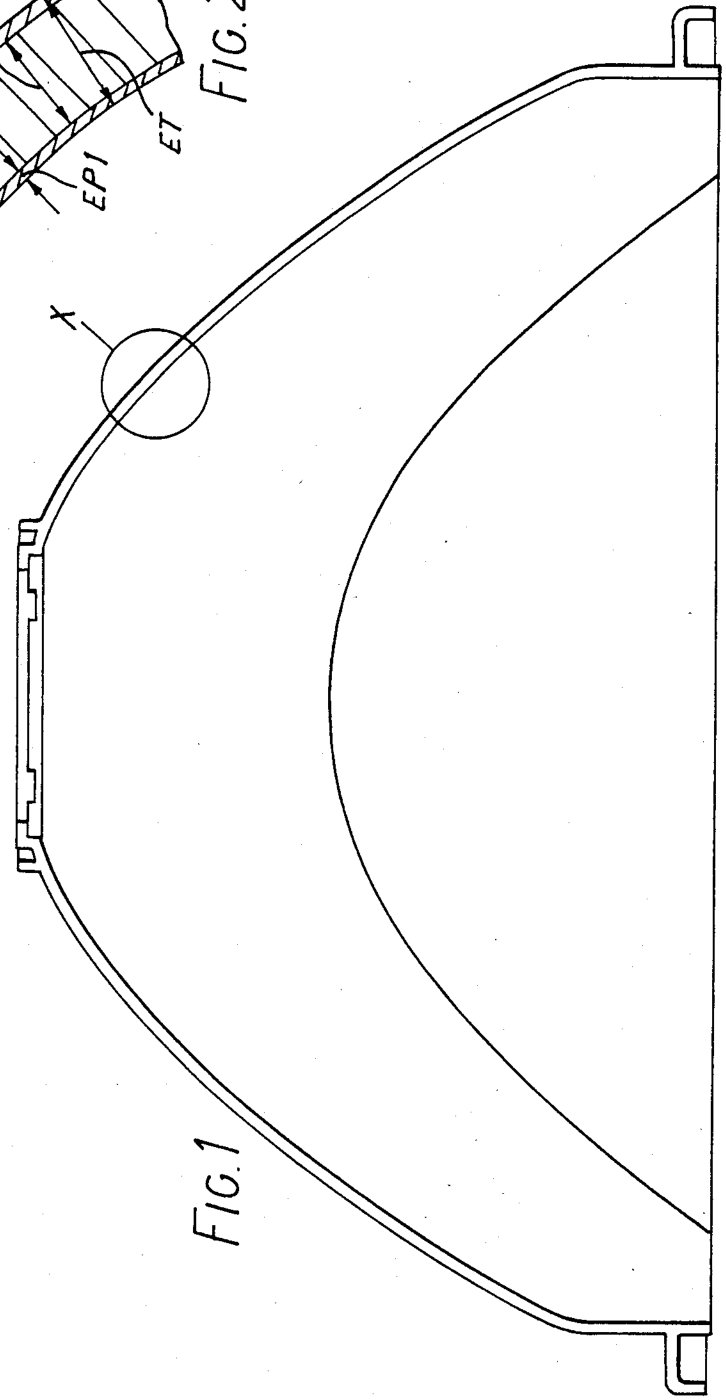
FIG. 1 is a section of a headlamp reflector.

In one preferred form of embodiment, where EPE represents the thickness of the external skin, the ratio EPI/EPE is between 0.8 and 1.2 in the optical zone of the reflector. The ratio of the thickness of the internal layer to that of the external layer thus is preferably as close as possible to 1, in order to constitute optimum injection conditions.

For preference, where ET represents the total thickness of the reflector, the ratio EPI+EPE/ET must be between 0.1 to 0.3 in the optical zone of the reflector. The sum of the thicknesses of the internal and external skins must be between 1/10th and 3/10ths of the total thickness of the reflector, in order to obtain the required mechanical qualities and facilitate the double injection procedures.

Given:

(i) EPI/EPE=0.8 to 1.2

(ii) (EPI+EPE)/ET=0.1 to 0.3

(iii) ET=EPI+ES+EPE for ease of calculation EPI=a, EPE=b and ES=c, x=0.8 to 1.2 and y=0.1 to 0.3.

It is required to calculate a/c (the ratio EPI to ES) from $$\text{(i) } \frac{a}{b} = x \therefore b = \frac{a}{x} \text{ (iv)}$$

substiting in equation (ii) which may be restated as $$\frac{a+b}{ET} = y \quad \text{(v)}$$

$$\frac{a + \frac{a}{x} = y}{a + \frac{a}{x} + c}$$

$$\text{from (v) } \frac{a}{c} = \frac{y}{(1-y)\left(1+\frac{1}{x}\right)}$$

In a preferred example x is 1 and taking 0.1 as a value for y in the prescribed range:

$$EP/ES = \frac{0.1}{(1-0.1)(1+1)} = \frac{0.1}{1.8} = \frac{1}{18}$$

where y=0.3 EPI/ES=3/14

With such ratios of EPI/ES a resulting internal skin layer can be achieved having a surface which displays no local variation greather than 0.002/mm. Thus the internal skin surface can receive a metalic reflecting surface without the lacquer coating applied in known methods.

The set of conditions as just defined permits of obtaining a reflector of polyamide/filled polyamide of optimum qualities, capable of mass production.

I claim:

1. A reflector produced by successive injections of thermoplastics material comprising a first, internal layer of high quality polyamide, a second layer of polyamide with a filler in the amount of 45 to 55% forming a supporting structure resistant to mechanical and thermal deformation, and a third external layer of polyamide, said first and third layers serving to surround said second layer, the ratio of the thickness of the first layer to the thickness of the second layer in the optical zone of the reflector being so selected that the surface of the first internal layer displays no local variation greater than 0.002/mm.

2. A reflector according to claim 1, wherein the ratio of the thickness of the first layer to the thickness of the third layer is between 0.8 and 1.2 in the optical zone of the reflector.

3. A reflector according to claim 1, wherein the ratio of the sum of the thicknesses of the first and third layers to the sum of the thicknesses of the first, second and third layers is between 0.1 and 0.3 in the optical zone of the reflector.

* * * * *